United States Patent [19]
Zhong et al.

[11] Patent Number: 5,612,861
[45] Date of Patent: Mar. 18, 1997

[54] METHOD AND APPARATUS FOR LOW VOLTAGE CMOS START CIRCUIT

[75] Inventors: Zhong K. Zhong, Lake Worth; Daniel Tran, Boynton Beach, both of Fla.

[73] Assignee: Motorola, Inc., Schaumburg, Ill.

[21] Appl. No.: 504,360

[22] Filed: Jul. 19, 1995

[51] Int. Cl.$^6$ .............................. H02M 7/25; H02M 7/517
[52] U.S. Cl. .................................... 363/59; 363/49
[58] Field of Search ........................ 363/49, 59, 60, 363/65, 101, 123; 323/282, 271, 284

[56] References Cited

U.S. PATENT DOCUMENTS

| | | | |
|---|---|---|---|
| 3,382,426 | 5/1968 | Mustain | 363/49 |
| 5,267,135 | 11/1993 | Tezuka et al. | 363/49 |
| 5,537,306 | 7/1996 | Blodgett | 363/60 |

FOREIGN PATENT DOCUMENTS

| | | | |
|---|---|---|---|
| 1062756 | 3/1966 | U.S.S.R. | 363/59 |
| 1373221 | 11/1969 | U.S.S.R. | 363/59 |

*Primary Examiner*—Peter S. Wong
*Assistant Examiner*—Adolf Berhane
*Attorney, Agent, or Firm*—James A. Lamb

[57] ABSTRACT

A method and apparatus for low voltage start circuit is provided. The start circuit (140) includes a first voltage converter (203) having a first booster circuit (210) and a first voltage multiplier (220) for converting a DC battery voltage to a converted DC voltage. The converted DC voltage is connected to an input of a second booster circuit (230) of a second voltage converter (205). The second voltage converter (205) includes the second booster circuit (230) and a second voltage multiplier (240). An output of the second voltage multiplier (240) is fed back to the input of the second booster circuit (230) for boosting the converted DC voltage to a predetermined threshold value. A voltage detector (136) compares the converted DC voltage to the predetermined threshold value. A controller (141) disables the start circuit (140) and enables a main DC-DC conversion circuit of the pager (100) when the converted DC voltage reaches the predetermined threshold value.

19 Claims, 8 Drawing Sheets

METHOD AND APPARATUS FOR LOW VOLTAGE CMOS START CIRCUIT

RELATED APPLICATIONS

Application Docket No. PT01842U filed Jul. 19, 1995 by Zhong et al., entitled "Method and Apparatus for DC to DC Conversion."

FIELD OF THE INVENTION

This invention relates in general to method and apparatus for a low voltage start circuit. More particularly, this invention relates to method and apparatus for a low voltage CMOS start circuit utilizing capacitive voltage multipliers and booster circuitry to raise the initial voltage during cold start to a level high enough to operate a device having switches with threshold voltages associated therewith.

BACKGROUND OF THE INVENTION

Portable receivers such as selective call receivers, pagers, personal messaging units (PMUs), and the like generally utilize a single cell battery for operation having a voltage in the range of 1.1 to 1.5 volts. In the design of selective call or paging receivers, it is desirable to prolong the operating time between battery charges or replacement. The physical size of paging receivers has reduced over the years. The size and electrical capacity of their batteries have also been reduced, potentially causing a reduction in the paging receiver's operating time. To compensate for the reduced battery capacity, circuitry has been developed to reduce the power drain of the paging products. Special battery saving techniques have been developed such that the only portions of the paging receiver are switched ON for brief intervals determined by the selective call coding protocol.

These devices can contain components which require more operating voltage than is available from a 1.4 V single cell battery. Accordingly, such devices require DC to DC conversion to provide the operating voltage needed for these components, such as a CMOS microprocessor, controller or LCD panel. DC to DC converters are used to boost the battery voltage to a converted voltage high enough to operate these components.

Inductive DC to DC converters have been used in the industry to boost battery voltage. One such converter is illustrated in U.S. Pat. No. 5,028,861 to Pace, assigned to the assignee of the present invention, generally described below. The DC to DC converter regulates the maximum current through an inductor. It operates within a paging receiver and boosts a voltage from a 1.4 V DC single cell battery to substantially 3.1 V DC in order to operate the circuits which require more voltage than provided by the single cell battery. The disadvantages of using inductive DC to DC converters versus capacitive DC to DC converters is that inductors are less efficient, larger, and cost more than capacitors. Inductors are also less reliable, since they are more susceptible to shock and vibration.

Other technologies, such as CMOS, have been investigated to increase the conversion efficiency. Current CMOS capacitive voltage doublers (DC-DC converters) use capacitors and alternate precharge and dump phases to generate double the battery voltage. For battery voltage $V_{BB}$, the doubler increases this voltage to 2 $V_{BB}$. A voltage regulator can then be used to lower this voltage to the required level for operating the various components. However, these systems require higher battery voltage during start up under heavy load current operation. Accordingly, a major problem with CMOS circuitry is establishing a voltage high enough to start the operation.

This high voltage requirement has forced the use of bipolar start (switching) circuits since their low turn on voltage can provide direct operation from a single cell battery. An example of a low power start circuit using bipolar technology is described in U.S. Pat. No. 4,961,006 to Pace et al., (the '006 patent), assigned to the assignee of the present application, generally described below.

The inductively loaded switching transistor of the '006 patent used in a DC to DC converter includes an inductive load and a coil switching transistor (NPN transistor) has a first emitter coupled to a first source of a supply voltage and a second emitter coupled to ground via a resistor. The collector of the transistor is coupled via an inductive load to a second source of supply voltage for conducting current flowing therethrough when the switching transistor is on. A drive circuit is provided which is coupled to the switching transistor for supplying a drive current thereto, and feedback is provided for adjusting the amount of base drive supplied to the switching transistor from the drive circuit.

A problem with these bipolar devices is that they require base drive currents to operate. Accordingly, the efficiency of the DC to DC conversion is degraded in high load current operation and is severely degraded in low load current operation.

Thus, there is a need in the art for boosting low battery voltage to a level sufficient to operate a device without requiring base drive currents to operate.

DESCRIPTION OF THE PREFERRED EMBODIMENTS

Figure 1:
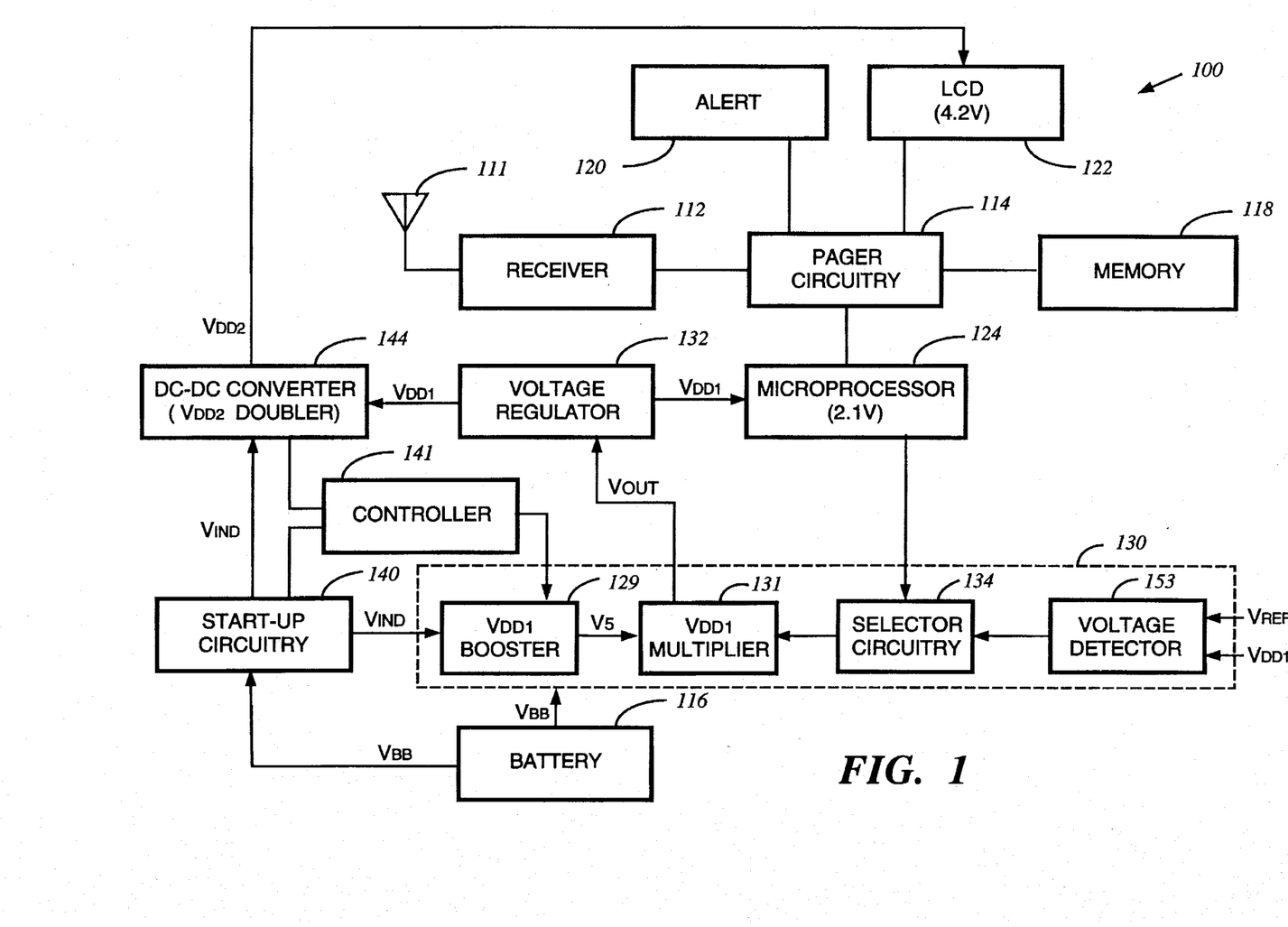
FIG. 1 is a block diagram of a pager operating in accordance with the present invention.

Referring initially to FIG. 1, a block diagram of a pager 100 operating in accordance with the present invention is shown. Receiving and decoding paging signals is well known in the art. The paging signals can be received on any of a plurality of paging protocols such as the GSC, POCSAG, or other protocols. In response to the reception of the paging signals, the receiver 112 is periodically activated. Paging signals are received by the antenna 111 and demodulated by the receiver 112. The paging signals can then be decoded by the pager circuitry 114 controlled by a controller, such as a microprocessor 124. The decoder operates in a low power mode while the receiver 112 is inactive and operates in a high power mode while the receiver 112 is active. The decoder of the microprocessor 124 searches the paging signal for an address which matches an address stored in memory 118. In response to detecting the address, an alert signal is generated by an alter device 120, such as a tone or vibration. A display, such as an LCD panel 122 can be provided for digitally displaying a received message.

The receiver is powered by a single cell battery 116 which generates a voltage $V_{BB}$, typically a 1.4 V battery which has a maximum voltage of substantially 1.55 V which decreases as the battery discharges over time.

The operation off a single cell battery, thus, requires DC to DC conversion to provide the operating voltage needed for the various components, such as a controller (microprocessor 124), which can require 2.1 volts for operation and an LCD panel 122, which can require 4.2 volts for operation.

The capacitive DC to DC converters 130, 144 of the preferred embodiment of the invention are configured into various multipliers (N) (e.g., N=2=doubler, N=3=tripler, etc.) by adding extra external capacitors. Switching modes between doubler and tripler configurations are preferably controlled by a switching technique, as described in a pending application, docket number PTO1842U, entitled "METHOD AND APPARATUS FOR DC TO DC CONVERSION", filed concurrently herewith, assigned to the assignee of the present application, incorporated by reference and described in part in conjunction with the operation of the present invention.

A voltage regulator 132 can then be utilized to decrease the voltage level to the required levels for operation. The configuration of the DC to DC converters can depend, in part, on the battery voltage $V_{BB}$ and, in part, on the load. Start circuit 140 provides the start-up voltages necessary to operate the DC-DC converters 130, 144, which require start-up voltages greater than the output voltage plus a prespecified threshold voltage. For example, to operate a NMOS switch having an output voltage of $V_{out}$, and a threshold voltage, $V_{TH}$, for the switch, the required input voltage to turn on the switch is calculated by $V_{INPUT} > V_{out} + V_{TH}$.

Figure 2:
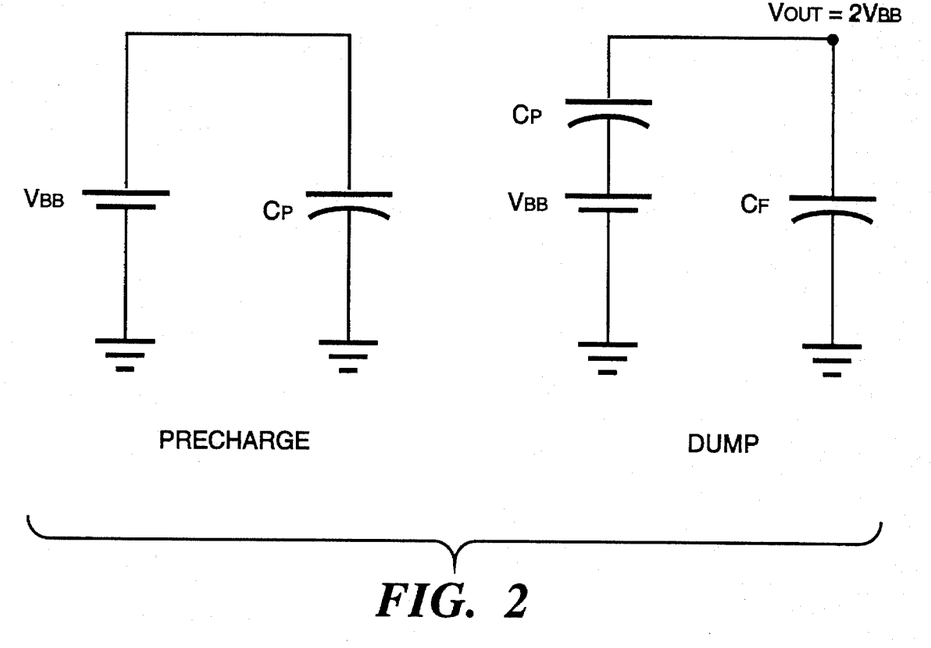
FIG. 2 is a circuit diagram of the doubler configuration for a capacitive DC to DC converter.

FIG. 2 illustrates the preferred configuration for a multiplier where N=2, i.e., doubler, in its precharge and dump stages. These stages are controlled by a clock circuit which continuously alternates the capacitor configurations between precharge and dump. During the precharge phase, capacitor Cp (pump-capacitor) is charged. Once the capacitor Cp is fully charged, the voltage stored in the capacitor VCp substantially equals the input voltage. During the dump phase, the capacitor Cp is in series with the input voltage supply. The output voltage measured at Vout equals the sum of the voltage in the capacitor and the input voltage. (Vout= VCp+the input voltage). Since the voltage in the capacitor VCp substantially equals the input voltage, the output voltage Vout substantially equals twice the input voltage. A filter capacitor, Cf, is used to smooth the output voltage.

Figure 3:
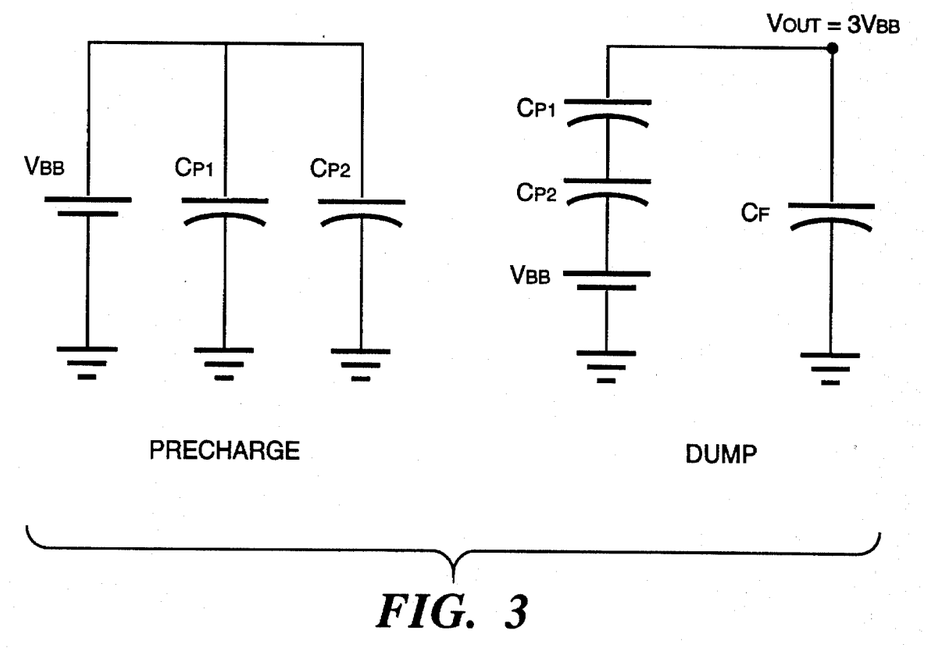
FIG. 3 is a circuit diagram of the tripler configuration for a capacitive DC to DC converter.

FIG. 3 illustrates the preferred configuration for a multiplier where N=3, i.e., tripler, in its precharge and dump stages. During the precharge phase, capacitors Cp1 and Cp2 are connected in parallel to the input voltage and are thereby charged. Once the capacitors are fully charged, the voltage in the capacitors VCp1 and VCp2 substantially equal the input voltage. Accordingly, at the dump phase, the output voltage measured at Vout equals the sum of the voltages in the capacitors VCp1 and VCp2 and the input voltage. (Vout=VCp1+VCp2+the input voltage) Since the voltage stored in the capacitors VCp1 and VCp2 substantially equal the input voltage, the output voltage Vout substantially equals three times the input voltage. A filter capacitor, Cf, is used to smooth the output voltage. Following the above examples, higher voltages at Vout can be generated by adding additional capacitors in the same manner. For example, a third capacitor Cp3 can be used to generate an output voltage Vout which is substantially four times the input voltage. Based on this disclosure, other configurations for larger multipliers can be configured by one skilled in the art based on the desired output voltage.

The present invention provides various supply voltage levels for multi-voltage level devices, such as a pager utilizing a microprocessor and an LCD display. In such a case, the preferred embodiment of the invention provides a regulated 2.1 volt supply, $V_{DD1}$, for the controller (microprocessor 124) operation, and a 4.2 volt supply, $V_{DD2}$, for the LCD panel 122. $V_{DD1}$ can be generated from the battery voltage, $V_{BB}$, with control signals generated from a $V_{DD1}$ booster circuit. $V_{DD2}$ (which, in this example, is double $V_{DD1}$) can be generated from $V_{DD1}$, with control signals generated from a $V_{DD2}$ booster circuit.

NMOS switches require control voltages which are higher than the output voltage because of the threshold voltages within the switch. Accordingly, when the switches of a device (e.g., DC to DC converter of a pager) are NMOS, the device cannot operate directly off a 1.4 V battery. The battery voltage would need to be boosted to a level higher than the output voltage plus the threshold voltage. For example, to operate a switch with an output voltage $V_{DD1}$ of 2.1 V, and a switch threshold voltage $V_{TH}$ ranging from 0.7 V to 1.0 V, the minimum input (control) voltage to turn on the switch is approximately 3.0 V ($V_5 > V_{DD1} + V_{TH}$).

Accordingly, the preferred embodiment of the present invention initially provides a voltage independent from the load, $V_{IND}$, generated by boosting the battery voltage $V_{BB}$ at the start of operation. Once the voltage $V_{IND}$ is boosted to a predetermined value (such as, a level high enough to operate the NMOS switches of the DC to DC converters of the pager), the start circuit 140 can be shut down and the voltage $V_{IND}$ can be subsequently generated from the output voltage $V_{DD2}$ of one of the DC-DC converters already used in the pager to boost voltage. The controller 141 in accordance with the present invention allows $V_{IND}$ to be generated independent of the load currents which allows the system to start up with battery voltages approaching the device threshold. The purpose of the start circuit 140 is to generate high voltage to start the DC-DC converters at the beginning (i.e., "cold start"). The preferred embodiment of the present invention utilizes a self boot-strapped configuration to boost $V_{IND}$ by providing a feedback loop from the output of the multipliers back to the input of the boosters.

Figure 4:
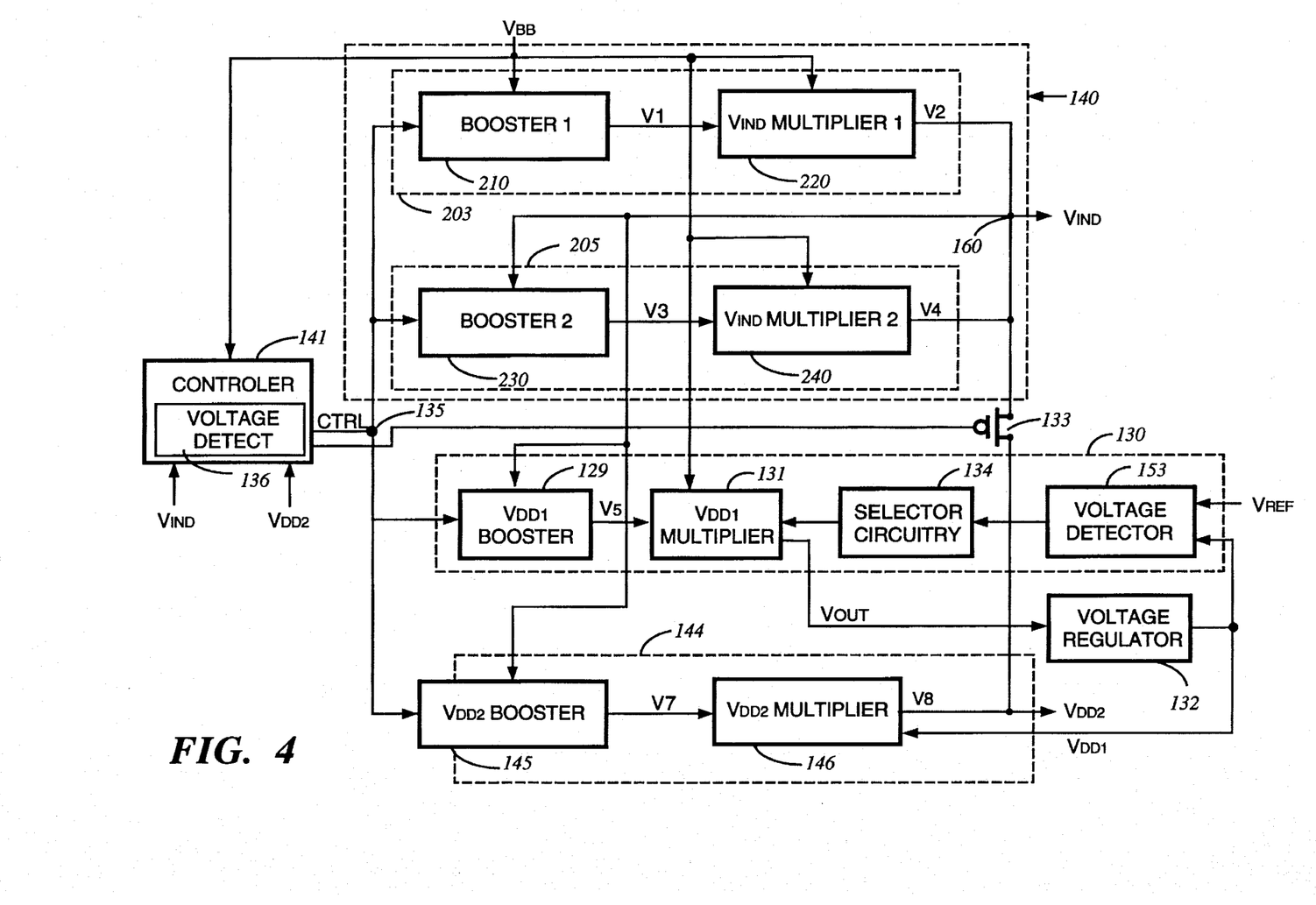
FIG. 4 is block diagram of a start circuit, a $V_{DD1}$ DC-DC converter, and a $V_{DD2}$ DC-DC converter in accordance with a preferred embodiment of the invention.

Generally, with reference to FIGS. 1 and 4, the start circuit 140 of the preferred embodiment of the present invention includes a first converter (DC-DC converter 203) for converting a DC battery voltage $V_{BB}$ to a converted DC voltage $V_{IND}$ at node 160. The DC-DC converter 203 includes a first booster circuit 210 which has an output voltage V1. The output voltage V1 represents the precharge and dump signals V1a and V1b, as detailed in FIG. 5. The voltage V1 is coupled to an input of a first voltage multiplier circuit 220. The first voltage multiplier circuit 220 produces a boosted output voltage V2 coupled at node 160 (VIND).

The converted DC voltage VIND is coupled to an input of a second booster circuit 230 of a second converter (DC-DC converter 205). The second booster circuit 230 produces an output voltage V3. The output voltage V3 represents the precharge and dump signals V3a and V3b, as detailed in FIG. 6. The output voltage V3 is coupled to a second voltage multiplier circuit 240. An output voltage V4 of the second voltage multiplier circuit 240 is also coupled to node 160 (VIND). The voltage VIND is fed back to the input of the second booster circuit 230. This configuration brings the converted DC voltage VIND up to a predetermined threshold value.

A voltage detect circuit 136 is provided in a controller 141 for comparing the converted DC voltage VIND to the predetermined threshold value. The voltage detect circuit 136 outputs a signal when VIND reaches the predetermined threshold value. In response, the controller 141, via a control bus 13S, disables the start circuit 140 and enables the main DC-DC converters 130, 144. In the preferred embodiment the controller 141 also couples the output voltage (V8, VDD2) Of the DC-DC converter 144 to VIND at node 160 when the converted DC voltage VIND reaches the predetermined threshold value so that the voltage VIND can be generated from the output voltage VDD2 of one of the main DC-DC converters 130, 144.

Turning now to FIG. 4, specifically the components of the start circuit 140, the VDD1 DC-DC converter 130, and the VDD2 DC-DC converter 144 are detailed. The start circuit 140 includes two DC-DC converters 203, 205. The first DC-DC converter 203 includes a first booster circuit 210 and a first VIND Multiplier-1 circuit 220. The second DC-DC converter 205 includes a second booster circuit 230 and a second VIND Multiplier-2 circuit 240.

The configurations of the VIND Multiplier-1 circuit 220 and the VIND Multiplier-2 circuit 240 will vary depending on the specific application. In a preferred embodiment, the first VIND Multiplier-1 circuit 220 and the second VIND Multiplier-2 circuit 240 are configured as triplers.

The VDD1 DC-DC converter 130 (preferably a switchable doubler/tripler) includes a VDD1 booster circuit 129 which provides an output voltage V5. The voltage V5 represents the precharge and dump signals V5a and V5b as detailed in FIG. 7. The voltage V5 is coupled to provide the precharge and dump signals to a VDD1 Multiplier circuit 131 which provides an output voltage Vout by multiplying the battery voltage VBB. A voltage regulator 132 is provided at the output (Vout) of the VDD1 Multiplier circuit 131. The voltage regulator 132 regulates the voltage Vout to a predetermined value VDD1.

The VDD2 DC-DC converter 144 (preferably a doubler configuration) includes a VDD2 booster circuit 145 which provides an output voltage V7. The voltage V7 represents the precharge and dump signals V7a and V7b as detailed in FIG. 8. The voltage V7 is coupled to provide the precharge and dump signals to a VDD2 Multiplier circuit 146 which provides an output voltage V8 (VDD2) by multiplying the input voltage VDD1. The configurations of the VDD1 Multiplier circuit 131 and the VDD2 Multiplier circuit 146 will vary depending on the specific application. In a preferred embodiment, the first VDD1 Multiplier circuit 131 is configured as switchable doubler/tripler to drive the microprocessor 124 which requires 2.1 volts for operation. The second VDD2 Multiplier circuit 146 is configured as a doubler to drive the LCD 122 which requires 4.2 volts for operation.

In the preferred embodiment, the controller 141 responsive to the voltage detect circuit 136, disables the start circuit 140 and enables the main DC-DC conversion circuitry which includes at least one DC-DC converter 130 when the converted DC voltage VIND reaches the predetermined threshold value. The output of one of the DC-DC converters 130, 144 is coupled at node 160 so that VIND can be generated from a DC-DC converter being used to drive other circuitry in the pager. In the preferred embodiment, the output V8 (VDD2) Of the second DC-DC converter 144 is coupled by a conventional switch 133 to node 160 to drive the VDD1 booster circuit 129 and the VDD2 booster circuit 145. In this instance, VDD2 (V8) is sufficient to drive the booster circuits 129, 145, so that the start circuit 140 is no longer required to be enabled.

The voltage VIND (generated by VDD2, V5) is input into the VDD1 Booster 129 and the VDD2 Booster 145. The VDD1 Booster 129 outputs a clock signal having a voltage V5 which is generated by boosting VIND (VDD2, V5). The output voltage V5, coupled to the input of the VDD1 Multiplier 131, is greater than the output voltage Vout of the VDD1 Multiplier 131 plus the threshold of the switch. Therefore, the NMOS switches (gates 152a–152h) of the VDD1 Multiplier 131 can continue to operate without the start circuit 140.

In operation, the system starts through a three phase process to allow for a low starting voltage. This is used for "cold start" situations, such as when a battery is replaced and the system must start up from a "dead" condition. It is preferable for the components of the start circuit 140 to take up as little space as possible, since the components are only used during this initial "cold start". The components might not be used again until another battery replacement or other situation that demands a "cold start".

Figure 5:
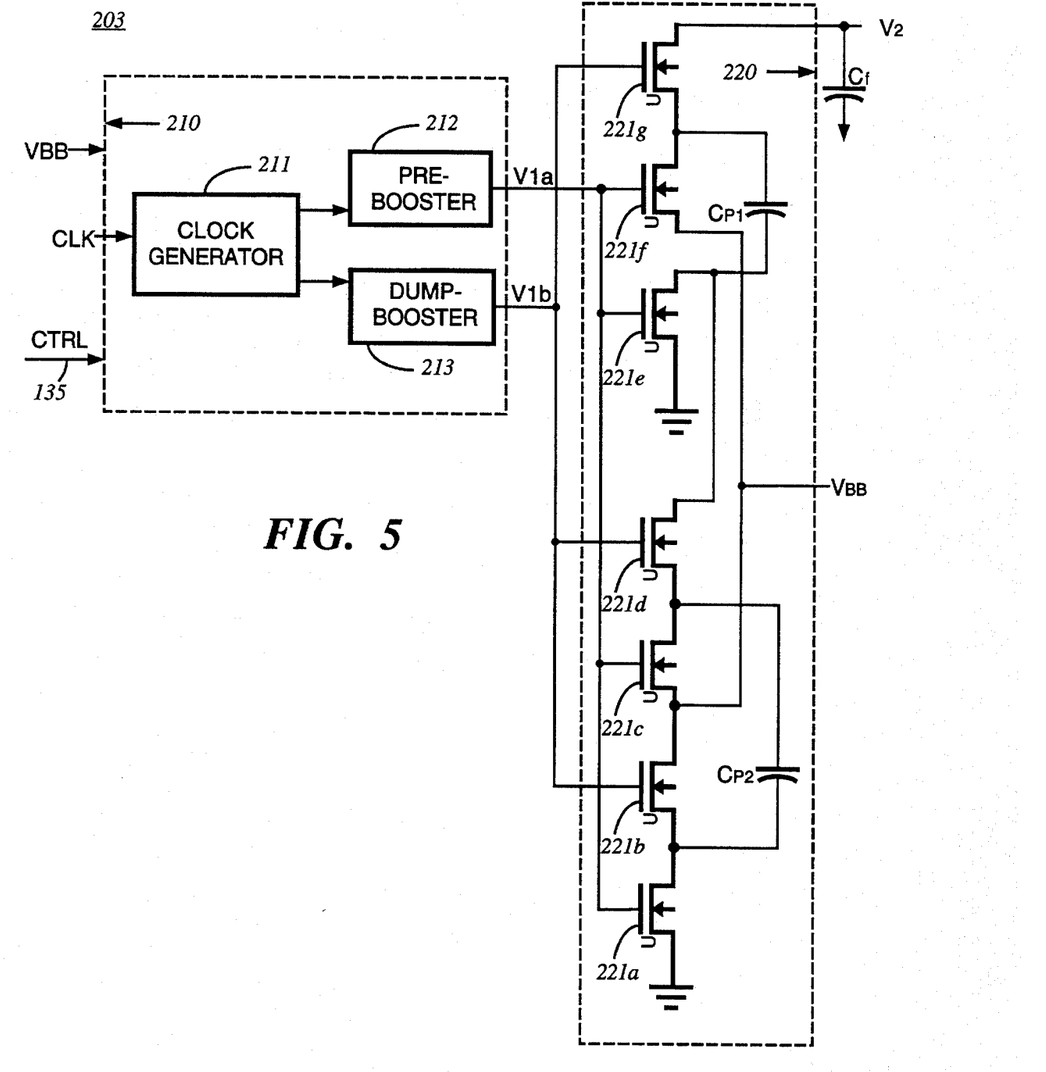
FIG. 5 is block and circuit diagram of a first DC-DC converter of the start circuit in accordance with the preferred embodiment of the invention.

In phase one of the start process, FIG. 5, the DC-DC converter 203 boosts the battery voltage VBB to a voltage level VIND greater than VBB. Specifically, a first booster circuit 210 and a first VIND Multiplier-1 circuit 220 of first DC-DC converter 203 of the start circuit 140 are powered by VBB. The booster circuit 210 includes a conventional charge pump circuit to provide precharge signals (V1a) and dump signals (V1b) to the first VIND Multiplier-1 circuit 220. A clock signal (from the controller 141) is input into a two-phase non-overlapping clock generator 211. Outputs of the clock generator 211 are input into a precharge booster 212 and a dump booster 213. The precharge booster 212 and dump booster 213 provide the signals (V1a and V1b) which switch the configurations of the capacitors (Cp1 and Cp2) of the VIND Multiplier-1 circuit 220 between precharge and dump phases.

The VIND Multiplier-1 circuit 220 preferably includes a tripler configuration having capacitors Cp1 and Cp2. During the precharge phase, capacitors Cp1 and Cp2 are connected in parallel to the input voltage VBB and are thereby charged. Gates 221a, 221c, 221e, and 221f are closed. At the dump phase, V2=VCp1+VCp2+VBB. Gates 221b, 221d, and 221g are closed. Accordingly, V2 (VIND) equals the battery voltage VBB plus any voltages stored in the capacitors Cp1 and Cp2. The voltage stored in the capacitors depends on the size of the capacitors. A filter capacitor, Cf, can be used to smooth the output voltage. The VIND Multiplier-1 circuit 220 is configured to provide an output of the converted DC voltage VIND greater than VBB.

Due to the preferred small size of the start circuit 140 for use in portable devices such as pagers, the output signal of the booster circuit 210 can be limited. Therefore, in this embodiment, the output of the V$_{IND}$ Multiplier-1 circuit 220 reaches up to approximately 1.5 V$_{BB}$, which is below the desired voltage (3 V$_{BB}$) to start up the main DC-DC conversion circuitry of this system configuration. Of course, with larger capacitors, the first DC-DC converter 203 would be able to generate the desired voltage of 3 V$_{BB}$ to drive the converters of this application. However, since small circuitry is desired in the preferred embodiment, the start circuit 140 includes a second DC-DC converter 205 to reach the desired voltage of 3V$_{BB}$. The second DC-DC converter 205 is configured similar to the first DC-DC converter 203. The second DC-DC converter 205 includes a second booster circuit 230 and a second V$_{IND}$ Multiplier-2 circuit 240.

Figure 6:
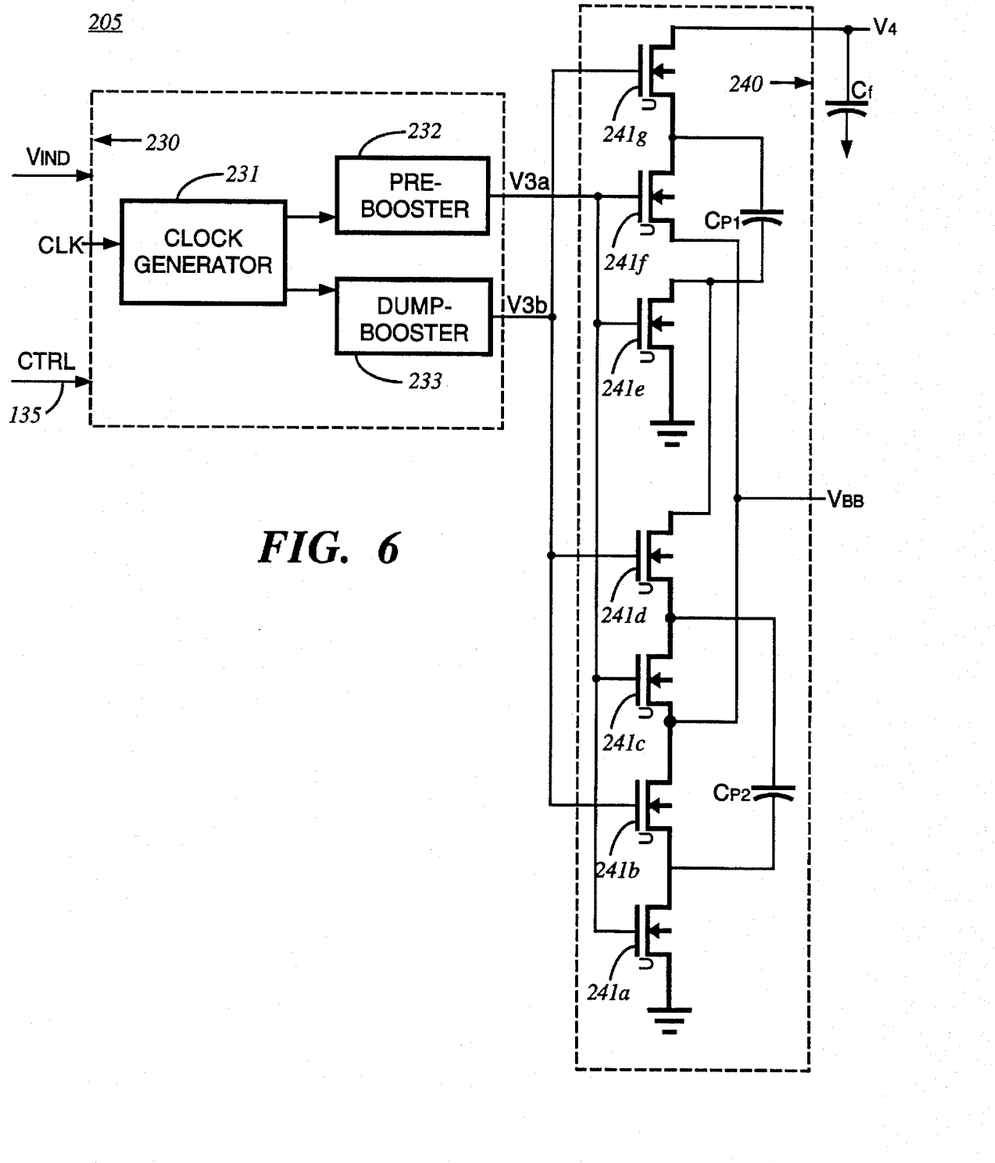
FIG. 6 is block and circuit diagram of a second DC-DC converter of the start circuit in accordance with the preferred embodiment of the invention.

In phase two of the start-up process, FIG. 6, the second DC-DC converter 205 boosts the voltage V$_{IND}$. The voltage V$_{IND}$ at node 160 at this stage includes both the output voltage (V2) of the first DC-DC converter 203 and the output voltage (V4) of the second DC-DC converter 205. Accordingly, the second booster circuit 230 of the second DC-DC converter 205 is powered by V$_{IND}$. The second booster circuit 230 includes a conventional charge pump circuit to provide precharge signals (V3$a$) and dump signals (V3$b$) to the second V$_{IND}$ Multiplier-2 circuit 240. A clock signal (from the controller 141) is input into a two-phase non-overlapping clock generator 231. Outputs of the clock generator 231 are input into a precharge booster 232 and a dump booster 233. The precharge booster 232 and dump booster 233 provide the signals (V3$a$ and V3$b$) which switch the configurations of the capacitors (Cp1 and Cp2) of the second V$_{IND}$ Multiplier-2 circuit 240 between precharge and dump phases.

The second V$_{IND}$ Multiplier-2 circuit 240 preferably includes a tripler configuration having capacitors Cp1 and Cp2. During the precharge phase, capacitors Cp1 and Cp2 are connected in parallel to the input voltage V$_{BB}$ and are thereby charged. Gates 241$a$, 241$c$, 241$e$, and 241$f$ are closed. At the dump phase, V4=VCp1+VCp2+V$_{IND}$. Gates 241$b$, 241$d$, and 241$g$ are closed. A filter capacitor, Cf, can be used to smooth the output voltage. The second V$_{IND}$ Multiplier-2 circuit 240 is designed to provide an output voltage (V4) coupled at node 160 to voltage V2, to generate V$_{IND}$ which is substantially equal to the threshold voltage (which, in this configuration is 3V$_{BB}$) necessary to start the main DC-DC conversion circuitry, i.e., the DC-DC converters of the system.

Specifically, V2=VCp1+VCp2+V$_{BB}$ initially from the first DC-DC converter 203. Then, with the configuration of the second DC-DC converter circuit 205 using voltage V2 from the first DC-DC converter 203 and a feedback loop from the output voltage (V4) of the second DC-DC converter circuit 205, the circuitry can generate a "self boot-strapped" voltage increase to reach the desired voltage (e.g., 3V$_{BB}$ for this application). Basically, the clock generates its signals and the pre-booster and dump-boosters send signals as before. However, this time, the clock pulse has an increase in its high level since V$_{IND}$ has increased. As the second V$_{IND}$ Multiplier-2 circuit 240 cycles between its precharge and dump phases, V$_{IND}$ (i.e., V2 and V4) will continue to increase in a self boot-strapped configuration until the desired voltage is reached. The controller 141 reads the output of the voltage detect circuit 136 to detect whether V$_{IND}$ (input to the voltage detector as V$_{IN}$) has reached the desired voltage, which, in this situation is 3V$_{BB}$.

Generally, the start circuit 140 reaches the desired voltage of 3V$_{BB}$ in less than one-third second. The time to reach 3V$_{BB}$, of course, can depend upon the operating temperature and the fabrication process for the components. The size of the external capacitors Cp1 and Cp2 of the first V$_{IND}$ Multiplier-1 circuit 220 and the second V$_{IND}$ Multiplier-2 circuit 240 can also affect the time to reach the desired voltage (3V$_{BB}$) in the start circuit 140.

In phase three, (FIG. 4), once V$_{IND}$ has reached the desired voltage, the controller 141 will enable the DC-DC converters 130, 144 (via the control bus 135) and connect the output voltage V8 to node 160 (V$_{IND}$) via switch 133. At this point, the controller 141 can shut down the start circuit 140 containing the first DC-DC converter circuit 203 and the second DC-DC converter circuit 205, since the output (V8, V$_{DD2}$) of the DC-DC converter 144 is used to operate the V$_{DD1}$ booster circuit 129 and the V$_{DD2}$ booster circuit 145. The first V$_{DD1}$ booster circuit 129 and the second V$_{DD2}$ booster circuit 145 are powered from the V$_{IND}$ supply (which is now coupled at node 160 to V$_{DD2}$) to drive the respective V$_{DD1}$ Multiplier circuit 131 and V$_{DD2}$ Multiplier circuit 146.

Figure 7:
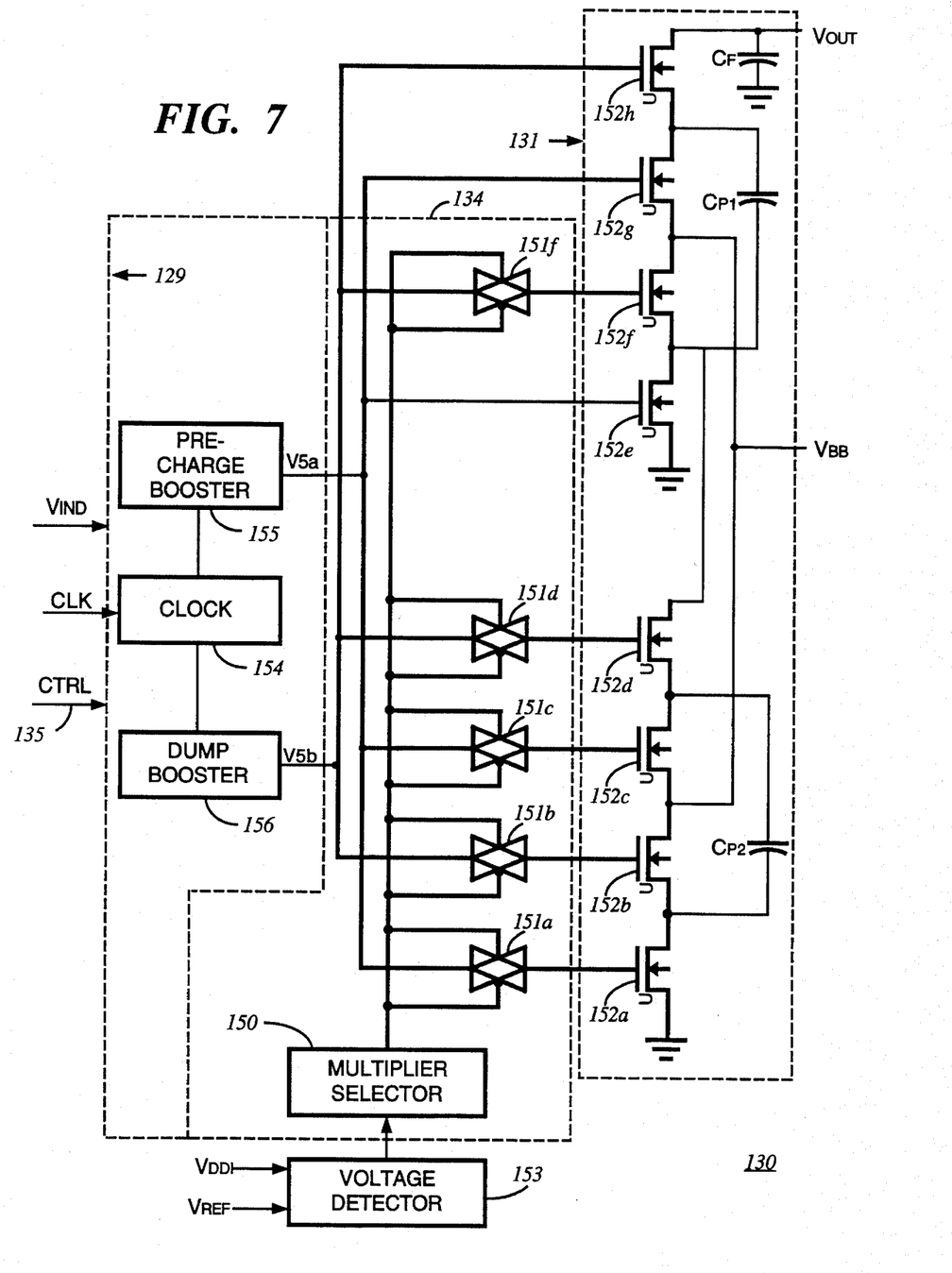
FIG. 7 is block and circuit diagram of the $V_{DD1}$ DC-DC converter (doubler/tripler) in accordance with the preferred embodiment of the invention.

In this example, FIG. 7, V$_{IND}$ (approx. 3V$_{BB}$) is input into the V$_{DD1}$ booster circuit 129 which includes a conventional charge pump circuit. A clock signal (from the controller 141) is input into a two-phase non-overlapping clock generator 154. Outputs of the clock generator 154 are input into a precharge booster 155 and a dump booster 156. The output voltages (V5$a$ and V5$b$) of the V$_{DD1}$ booster circuit 129 are coupled to the V$_{DD1}$ Multiplier circuit 131, which is preferably a switchable doubler/tripler conversion circuit. The precharge booster 155 and the dump booster 156 generate the signals (V5$a$ and V5$b$) which switch the configurations of the capacitors (Cp1 and Cp2) of the V$_{DD1}$ Multiplier circuit 131 between precharge and dump phases. The output (Vout) of the V$_{DD1}$ Multiplier circuit 131 is coupled to a voltage regulator 132 to provide the regulated voltage V$_{DD1}$.

A multiplier selector 150 is utilized to change modes between the doubler and tripler configurations of the V$_{DD1}$ Multiplier circuit 131. The selector circuitry includes selector logic switches 151$a$–$d$, $f$ and numerous gates 152$a$–$h$ to configure the doubler and tripler conversion circuits. To initially start-up the V$_{DD1}$ Multiplier circuit 131, for Vout= 2.1 V, where the threshold voltage, VTH, for the switch ranges from 0.7 V to 1.0 V, the minimum input voltage to turn on the circuitry is approximately 3.0 V (V5 >Vout+ VTH). The multiplier selector 150 controls the activation of the switches, 151$a$–$d$, $f$ in response to the voltage detector 153. Capacitors Cp1 and CP2 are charged depending on the activated gates. A filter capacitor Cf is used to smooth the output.

In the doubler configuration of the V$_{DD1}$ Multiplier circuit 131, the multiplier selector 150 closes switch 151$f$ to select gate 152$f$. Gates 152$e$, 152$g$ and 152$h$ are directly connected without switches and, therefore, are always selected in this configuration. In the precharge phase, gates 152$e$ and 152$g$ (directly) are connected to the precharge booster 155 such that CP1 is charged to V$_{BB}$. During the dump phase, gates 152$h$ (directly) and 152$f$ (through switch 151$f$) are connected to the dump booster 156 such that the output voltage (Vout) of the V$_{DD1}$ Multiplier circuit 131 is equal to VCp1+V$_{BB}$= 2V$_{BB}$. A filter capacitor, Cf, is used to smooth the output voltage.

In the tripler configuration of the V$_{DD1}$ Multiplier circuit 131, the multiplier selector 150 closes switches 151$a$, 151$b$, 151$e$, 151$d$, (switch 151$f$ is open) to select gates 152$a$, 152$b$, 152$e$ and 152$d$. Gates 152$e$, 152$g$ and 152$h$ are directly connected without switches. In the precharge phase, gates 152$a$ and 152$e$ (through switches 151$a$ and 151$e$) and gates 152e and 152g (directly) are connected to the precharge booster 155 to charge the capacitors Cp1 and CP2 up to a voltage substantially equal to VBB. During the dump phase, gates 152b, 152d (through switches 151b and 151d) and gate 152h (directly) are connected to the dump booster 156, such that the output voltage (Vout) of the VDD1 Multiplier circuit 131 is equal to VCp1+VCp2+VBB (approx. 3VBB). A filter capacitor, Cf, is used to smooth the output voltage.

Generally, in the preferred embodiment, the switching between the doubler and tripler configurations is determined by VDD1 voltage level. However, the switching between these configurations can depend on other voltage levels in the circuit or on the particular application. Examples of alternate switching techniques are disclosed in the referenced co-pending application docket number PTO1842U.

In the preferred embodiment, the multiplier selector 150 initially enables a first DC-DC converter (doubler configuration of the VDD1 Multiplier circuit 131). Then the multiplier selector 150 disables the first DC-DC converter (doubler configuration of the VDD1 Multiplier circuit 131) and enables a second DC-DC converter (tripler configuration of the VDD1 Multiplier circuit 131) when a voltage level VDD1 can no longer reach a reference voltage, VREF. The reference voltage can be substantially equal to a minimum required voltage to adequately drive a load, such as a microprocessor. The doubler configuration of the VDD1 Multiplier circuit 131 includes at least one capacitor charged by a voltage source having a voltage VBB, configured to provide double VBB. The tripler configuration of the VDD1 Multiplier circuit 131 includes at least two capacitors charged by the voltage source having the voltage VBB, configured to provide triple VBB.

Figure 9:
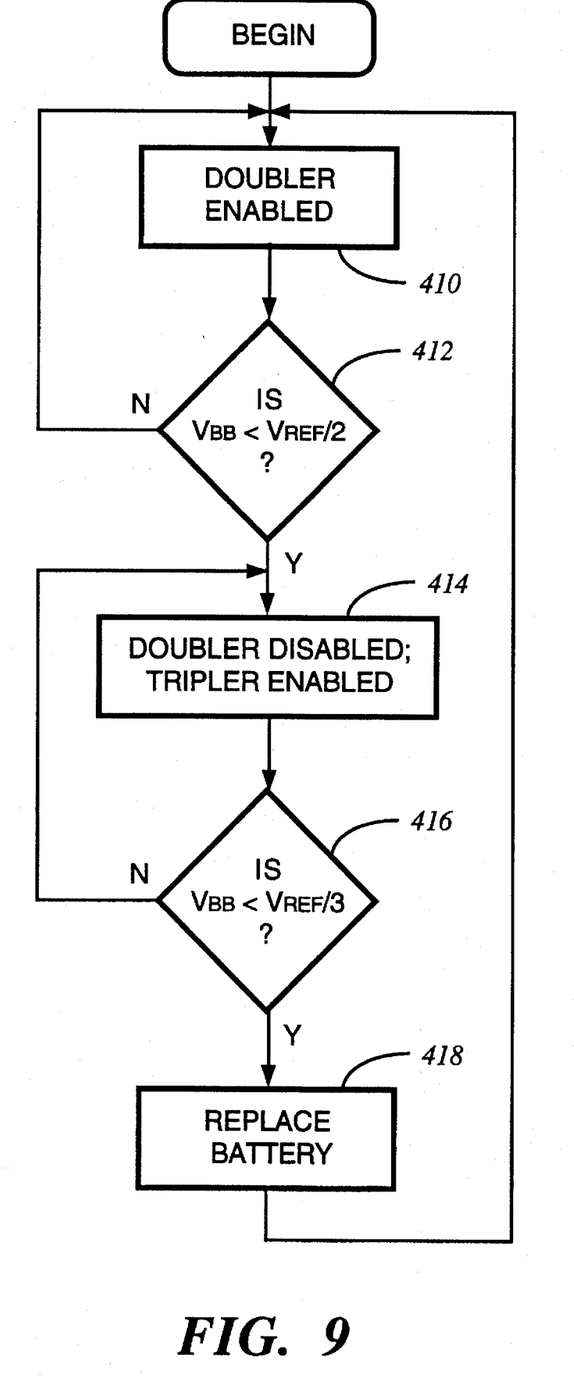
FIG. 9 is a flow diagram representing the operation of the DC to DC converter in accordance with the preferred embodiment of the invention.

For example, as illustrated in the flow chart of FIG. 9, and detailed in the co-pending application referenced above, the voltage detector 153 is used to detect a voltage level in the circuit. The multiplier selector 150, responsive to the voltage detector 153, then will alternately enable the doubler or tripler configurations depending on the voltage level. Specifically, the multiplier selector 150 initially enables the first converter (doubler configuration of the VDD1 Multiplier circuit 131), block 410, and then disables the first converter and enables the second converter (tripler configuration of the VDD1 Multiplier circuit 131), block 414 when the voltage level drops below a reference voltage, VREF (in this example VBB<VREF/2), decision block 412. Preferably, the reference voltage is substantially equal to a minimum required voltage to adequately drive a load.

The voltage doubler configuration of the VDD1 Multiplier circuit 131 includes at least one capacitor charged by a voltage source having a voltage VBB, configured to provide double VBB, and the voltage tripler configuration of the VDD1 Multiplier circuit 131 includes at least two capacitors charged by the voltage source having the voltage VBB, configured to provide triple VBB. If the voltage then falls below the minimum operating voltage (in this example VBB<VREF/3) decision block 416, the battery can be replaced, block 418. If necessary, further multipliers can be utilized to produce Vout=NVBB, where N=multiplier value. It will be appreciated by one of ordinary skill in the art that other situations can exist which will require further switching between the doubler and tripler configurations.

In the preferred embodiment, another DC-DC converter 144 is provided for driving a load, such as an LCD 122. The output voltage (Vout) of the first DC-DC converter (doubler configuration of the VDD1 Multiplier circuit 131) and the second DC-DC converter (tripler configuration of the VDD1 Multiplier circuit 131) can be input thereto, directly or through a voltage regulator 132. The DC-DC converter 144 is preferably a voltage doubler having a capacitor charged by the output (VDD1) of the VDD1 Multiplier circuit 131, configured to provide double the output of the VDD1 Multiplier circuit 131.

Figure 8:
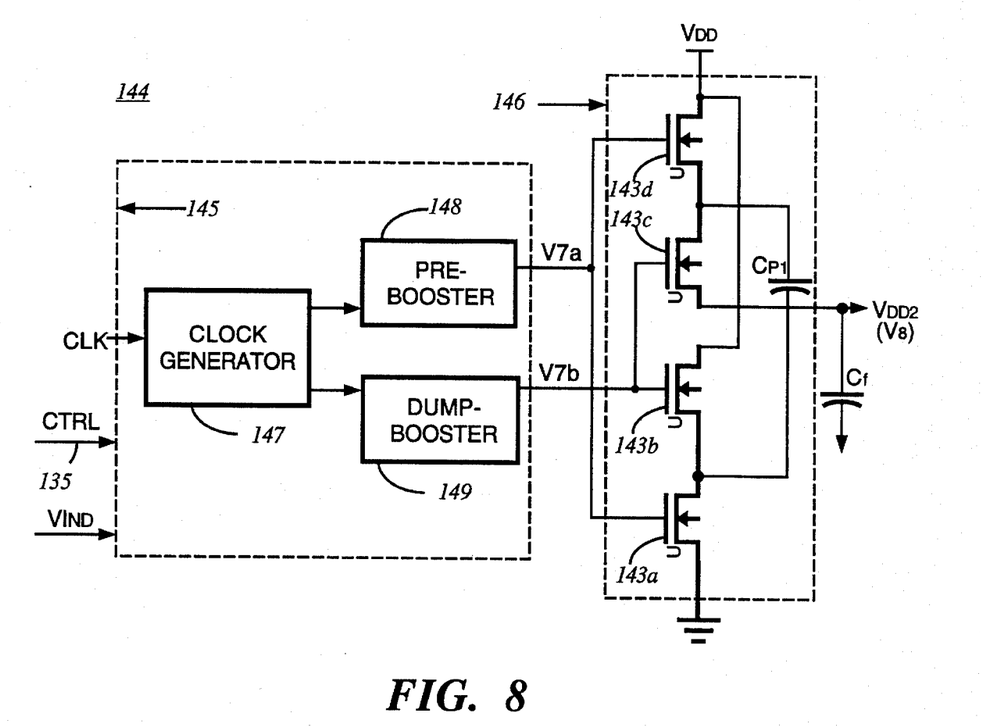
FIG. 8 is block and circuit diagram of the $V_{DD2}$ DC-DC (doubler) converter in accordance with the preferred embodiment of the invention.

Turning now to FIG. 8, VIND (i.e., V8, VDD2) is input into the second VDD2 booster circuit 145 which includes a conventional charge pump circuit. A clock signal is input into a two-phase non-overlapping clock generator 147. Outputs of the clock generator 147 are input into a precharge booster 148 and a dump booster 149. The output voltages (V7a and V7b) of the VDD2 booster circuit 145 are coupled to the VDD2 Multiplier circuit 146. The precharge booster 148 and dump booster 149 generate the signals which switch the configurations of the capacitor Cp1 of the VDD2 Multiplier circuit 146 between precharge and dump phases. To initially start-up the VDD2 Multiplier circuit 146, for VDD2= 4.2 V, where the threshold voltage, VTH, for the switch ranges from 0.7 V to 1.0 V, the minimum input voltage to turn on the circuitry is approximately 5.0 V (V7 >VDD2+ VTH).

In the VDD2 Multiplier circuit 146, during the precharge phase, capacitor Cp1 (pump-capacitor) is charged to VDD1 (2.1 V). Gates 143a and 143d are closed. Then during the dump phase, Cp1 is in series with VDD1 to produce an output voltage (V8, VDD2) equal to VCp1+VDD1=2 VDD1 (4.2 V). Gates 143b and 143c are closed. A filter capacitor, Cf, is used to smooth the output voltage. In this example, no voltage regulation is necessary, since the output (V8, VDD2) of the VDD2 Multiplier circuit 146 (4.2 V) equals the voltage required to drive the LCD (4.2 V). If another component requires lower voltage, a voltage regulator can be used to lower the voltage to the required voltage. If no other components are necessary, the second DC-DC converter 144 can be entirely eliminated, in an alternate embodiment.

Generally the method for providing a start-up voltage includes: 1) enabling the start circuit 140 including the first and second converters; 2) converting the DC battery voltage to a boosted output voltage V2 greater than the battery voltage by the first converter; 3) boosting an internal voltage VIND to an output voltage V3 by a booster circuit of the second converter; 4) multiplying the DC battery voltage to provide an output voltage V4 by a multiplier circuit of the second converter; 5) coupling the output voltage V4 to the output voltage V2 to provide the internal voltage VIND; 6) providing the internal voltage VIND to a main DC-DC converter circuit; 7) comparing the internal voltage VIND to a predetermined level; 8) providing an output signal when the internal voltage VIND reaches the predetermined level; and 9) enabling the main DC-DC converter circuit, coupling an output voltage VOUT of the main DC-DC converter circuit to an input of the main DC-DC converter circuit, and disabling the start circuit 140 in response to the output signal.

A number of advantages arise from practice of this method and apparatus for a low voltage start circuit. The preferred embodiment of the invention provides circuitry which establishes a voltage high enough to start the operations independent of the load and without requiring base drive currents to operate for use in conjunction with CMOS circuitry. Such circuitry reduces size and improves efficiency when used in conjunction with capacitive DC-DC conversion circuits. This configuration allows for a "cold start" at low voltages (VBB) which is very competitive with present bipolar devices, but it consumes less current.

Thus, it is apparent that there has been provided, in accordance with the present invention, a method and apparatus for a low voltage start circuit. While the present invention has been described and illustrated with reference to specific embodiments thereof, it is not intended that the invention be limited to these illustrative embodiments. Those skilled in the art will recognize, after review of the foregoing description, that variations and modifications differing from the illustrative embodiments are possible. It is intended that all such variations and modifications as fall within the spirit and scope of the invention be included within the appended claims.

What is claimed is:

1. A start circuit for boosting a DC battery voltage to an initial predetermined voltage level $V_{IND}$ which is greater than the DC battery voltage, comprising:

first conversion means for boosting a DC battery voltage $V_{BB}$, coupled to an input thereof, to a boosted output voltage $V2$;

second conversion means comprising second boosting means coupled to second multiplier means;

said second boosting means providing a boosted output voltage $V3$; and said second multiplier means, having said voltage $V3$ input thereto and having the DC battery voltage input thereto, for providing a boosted output voltage $V4$, wherein said output voltage $V4$ is coupled to said output voltage $V2$ to provide an internal voltage $V_{IND}$, said internal voltage $V_{IND}$ coupled as an input to said second boosting means and as an input to a main DC-DC conversion means;

voltage detect means for comparing said internal voltage $V_{IND}$ to a predetermined threshold level and for providing an output signal for disabling said first and second conversion means of said start circuit when said internal voltage $V_{IND}$ reaches the predetermined voltage level; and switching means, responsive to said voltage detect means, for coupling an output voltage $V_{DD2}$ of the main DC-DC conversion means to an input of the main DC-DC conversion means.

2. The start circuit of claim 1, wherein said first conversion means comprises a first boosting means coupled to a first multiplier means, said first boosting means comprising a charge pump circuit to provide precharge and dump signals to said first multiplier means.

3. The start circuit of claim 2, wherein said first multiplier means comprises a multiplier having at least one capacitor charged by the DC battery voltage, configured to provide said boosted output voltage $V2$ greater than the DC battery voltage.

4. The start circuit of claim 3, wherein said second boosting means comprises a charge pump circuit to provide precharge and dump signals to said second multiplier means.

5. The start circuit of claim 4, wherein said second multiplier means comprises a multiplier having at least one capacitor charged by the DC battery voltage, configured to provide said boosted output voltage $V4$.

6. The start circuit of claim 5, wherein said main DC-DC conversion means comprises first DC-DC converter means.

7. The start circuit of claim 6, wherein said main DC-DC conversion means further comprises second DC-DC converter means and a second switching means, said second switching means initially enabling said first DC-DC converter means, and wherein said second switching means disables said first DC-DC converter means and enables said second DC-DC converter means when a voltage level can no longer reach a reference voltage.

8. The start circuit of claim 7, wherein said first DC-DC converter means comprises a voltage doubler, and wherein said second DC-DC converter means comprises a voltage tripler, and wherein said reference voltage is substantially equal to a minimum required voltage to adequately drive a load of the main DC-DC conversion means.

9. The start circuit of claim 8, wherein said voltage doubler comprises at least one capacitor charged by the DC battery voltage, configured to provide double the DC battery voltage, and wherein said voltage tripler comprises at least two capacitors charged by the DC battery voltage, configured to provide triple the DC battery voltage.

10. The start circuit of claim 9, wherein said main DC-DC conversion means further comprises third DC-DC converter means, having outputs of said first and second DC-DC converter means input thereto.

11. The start circuit of claim 10, wherein said third DC-DC converter means comprises a voltage doubler, and wherein said voltage doubler comprises a capacitor charged by said outputs of said first and second DC-DC converter means, configured to provide double said outputs of said first and second DC-DC converter means.

12. A start circuit for boosting a DC battery voltage to an initial predetermined voltage level $V_{IND}$ which is greater than the DC battery voltage, comprising:

first conversion means for boosting a DC battery voltage $V_{BB}$, coupled to an input thereof, to a boosted output voltage $V2$;

second conversion means comprising second boosting means coupled to second multiplier means;

said second boosting means providing a boosted output voltage $V3$, wherein said second boosting means comprises a charge pump circuit to provide precharge and dump signals to said second multiplier means; and said second multiplier means, having said voltage $V3$ input thereto and having the DC battery voltage input thereto, for providing a boosted output voltage $V4$, wherein said second multiplier means comprises a multiplier having at least one capacitor charged by the DC battery voltage, wherein said output voltage $V4$ is coupled to said output voltage $V2$ to provide an internal voltage $V_{IND}$, said internal voltage $V_{IND}$ coupled as an input to said second boosting means and as an input to a main DC-DC conversion means;

voltage detect means for comparing said internal voltage $V_{IND}$ to a predetermined threshold level and for providing an output signal for disabling said first and second conversion means of said start circuit when said internal voltage $V_{IND}$ reaches the predetermined voltage level; and switching means, responsive to said voltage detect means, for coupling an output voltage $V_{DD2}$ of said main DC-DC conversion means to an input of said main DC-DC conversion means.

13. The start circuit of claim 12, wherein said first conversion means comprises a first boosting means coupled to a first multiplier means, said first boosting means comprising a charge pump circuit to provide precharge and dump signals to said first multiplier means.

14. The start circuit of claim 13, wherein said first multiplier means comprises a multiplier having at least one capacitor charged by the DC battery voltage, configured to provide said boosted output voltage $V2$ greater than the DC battery voltage.

15. The start circuit of claim 12, wherein said main DC-DC conversion means comprises first DC-DC converter means.

16. The start circuit of claim 15, wherein said main DC-DC conversion means further comprises second DC-DC converter means and second switching means, said second switching means initially enabling said first DC-DC converter means, and wherein said second switching means disables said first DC-DC converter means and enables said second DC-DC converter means when a voltage level can no longer reach a reference voltage.

17. The start circuit of claim 16, wherein said first DC-DC converter means comprises a voltage doubler, and wherein said second DC-DC converter means comprises a voltage tripler, and wherein said reference voltage is substantially equal to a minimum required voltage to adequately drive a load of the main DC-DC conversion means.

18. A method for boosting a DC battery voltage to an initial predetermined voltage level which is greater than the DC battery voltage, comprising the steps of:

enabling first and second conversion means;

converting the DC battery voltage to a boosted output voltage V2 greater than the DC battery voltage by said first conversion means;

boosting a internal voltage $V_{IND}$ to an output voltage V3 by a booster circuit of said second conversion means;

multiplying the DC battery voltage to provide an output voltage V4 by a multiplier circuit of said second conversion means;

coupling said output voltage V4 to said output voltage V2 to provide said internal voltage $V_{IND}$;

providing said internal voltage $V_{IND}$ to a main DC-DC conversion means;

comparing said internal voltage $V_{IND}$ to the predetermined voltage level;

providing an output signal when said internal voltage $V_{IND}$ reaches said predetermined voltage level; and enabling the main DC-DC conversion means, coupling an output voltage $V_{DD2}$ of the main DC-DC conversion means to an input of the main DC-DC conversion means, and disabling said first and second conversion means in response to said output signal.

19. The method of claim 18, wherein said multiplying step comprises the step of supplying the DC battery voltage to a voltage tripler circuit to provide said output voltage V4.

* * * * *